May 22, 1928.
W. H. ODIORNE
BALLOT HOLDER FOR TRUCKS
Filed July 16, 1925
1,670,738
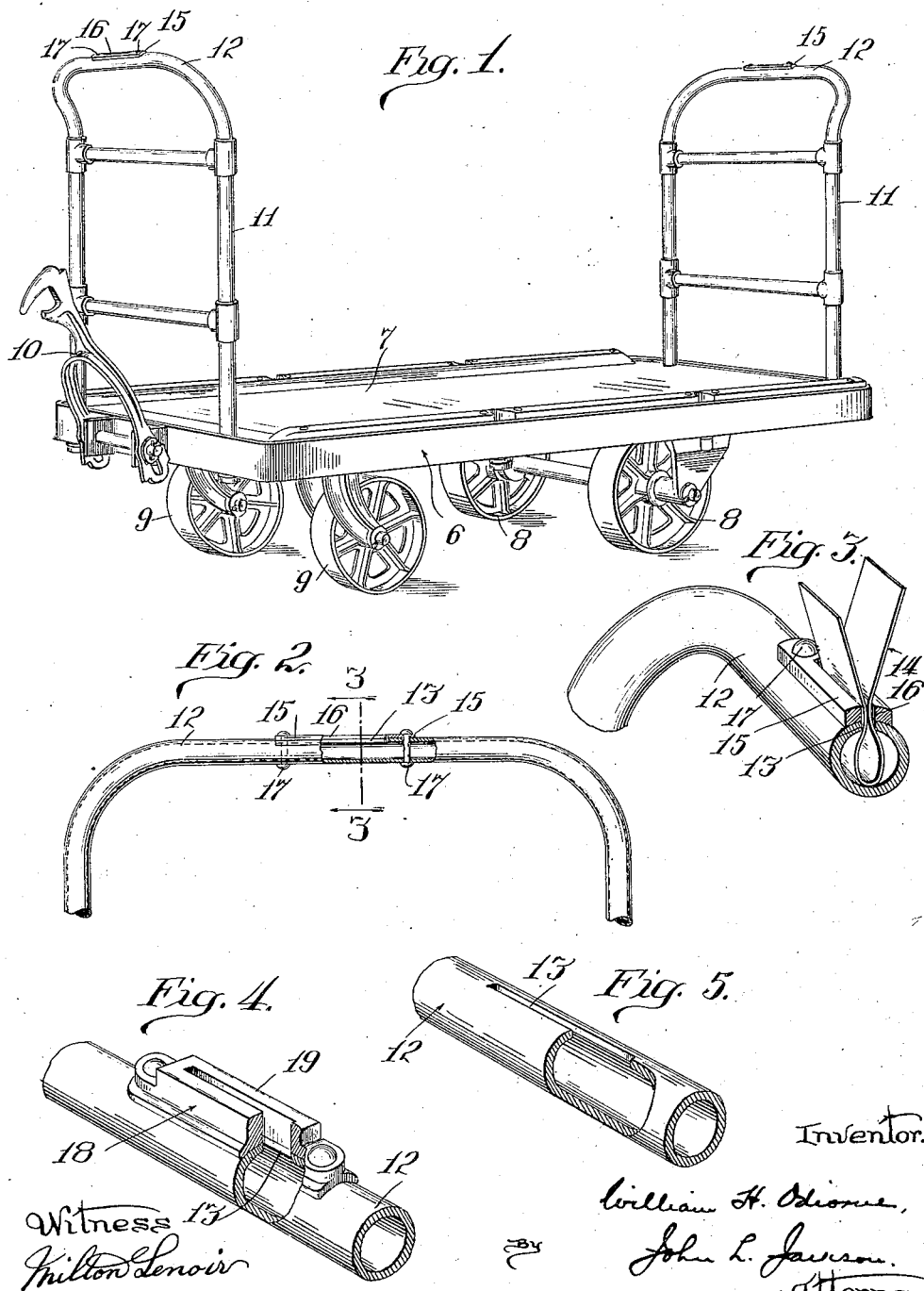

Patented May 22, 1928.

1,670,738

UNITED STATES PATENT OFFICE.

WILLIAM H. ODIORNE, OF CHICAGO, ILLINOIS, ASSIGNOR TO MERCURY MANUFACTURING COMPANY, OF CHICAGO, ILLINOIS, A CORPORATION OF ILLINOIS.

BALLOT HOLDER FOR TRUCKS.

Application filed July 16, 1925. Serial No. 43,898.

My invention relates to trucks or trailers such as are commonly used on or about railway station platforms, warehouses, etc. for transporting packages of merchandise in connection with the loading and unloading of freight and express cars. Now-a-days it is common practice to hitch a number of trailers together in the form of a train and haul the train from place to place by means of a small motor. As the trailers are loaded with a large number of packages of merchandise, and generally the different trailers of a train are loaded with goods having different destinations, it is desirable that convenient means be provided by which the destination of the goods on a given trailer may be conveniently indicated so that no time may be lost in distributing the different trailers to the appropriate cars. Usually the destination of the goods is indicated by slips commonly known as ballots or verichecks, and heretofore no satisfactory means have been provided for attaching the ballot or vericheck to the trailer so that it would be held securely on the trailer during the transportation of the goods to the car, and could be conveniently removed intact after the goods had been loaded. To provide means by which this may be accomplished is the object of my present invention, which object I accomplish as illustrated in the drawings and as hereinafter described. What I regard as new is set forth in the claim.

In the accompanying drawings,—

Fig. 1 is a perspective view of a trailer equipped with my improvement;

Fig. 2 is a detail, partly in section, illustrating the means for holding the ballot;

Fig. 3 is an enlarged perspective view, partly in section, on line 3—3 of Fig. 2;

Fig. 4 is a detail, partly in section, illustrating a modification; and

Fig. 5 is a similar view showing a further modification.

Referring to the drawings,—6 indicates the trailer as a whole, which comprises a platform 7 mounted on rear wheels 8 and front caster wheels 9. At its front end the trailer is provided with a hitch device in the form of a hook 10 by which it may be coupled to an adjoining trailer, and at the other end it is provided with a link adapted to cooperate with the hook 10 of an adjoining trailer, so that a series of trailers may be coupled together in the form of a train. The trailer is provided, preferably at each end, with a rack 11 which mainly is upright, the upper portion 12 of the rack being preferably rounded and curved outwardly, as shown in Fig. 1. As best shown in Figs. 2 to 5, the portion 12 of each of the racks is tubular, and it is provided, preferably at the central portion thereof, with a longitudinal slot 13 at one side thereof, preferably the upper side, which slot forms a socket for receiving the ballot or vericheck. This slot is slightly longer than the width of the ballot or vericheck, one of which is shown at 14 in Fig. 3, the width of the slot being such that by folding the ballot, as shown in Fig. 3, the folded margin thereof may be thrust through the slot 13 into the interior of the member 12, where the fold will expand and serve to hold the ballot in place. At this time the ends of the ballot will project through the slot so that they may easily be grasped when it is desired to remove the ballot. By this construction the ballot may be very easily applied to or removed from the member 12, and when in place in the slot 13 it is held firmly enough so that there is no danger that it will accidentally become dislodged. Furthermore, the ballot is not mutilated, as would be apt to be the case if it were attached to the rack by a string after the manner of a tag. Where tags are used, freight handlers in their haste are disposed to jerk them off, thereby tearing them, and, besides, tags are objectionable because tying them causes delay, and is inconvenient, especially in cold or stormy weather.

My invention in its simplest form is shown in Fig. 5, in which the member 12 is provided simply with the slot 13, but I prefer to use the construction shown in the remaining figures, in which a plate 15 is fitted over the slot 13, said plate having a slot 16 which registers with the slot 13, thereby reinforcing the member 12 adjacent to the slot and making the slot deeper so that it provides a more extended bearing surface for the ballot. As shown in Fig. 2, the plate 15 is secured in place by rivets 17. In Fig. 4 an arrangement similar to that shown in Fig. 2 is illustrated, but instead of a plate 15 of uniform thickness, I provide a plate 18, the intermediate portion of which is made thicker, as shown at 19, thereby further increasing the thickness of the material at the slot.

Preferably both racks are provided with the slots 13 so that freight handlers may use whichever slot is more convenient. It will be understood that instead of placing the slot 13 at the upper side of the member 12 as shown in the drawing, it may be placed so as to extend horizontally, or at any other convenient angle, or if preferred it may be arranged to open downwardly in order to better protect the ballot from the weather. In the latter case there is no danger that the ballot will drop out, as the expansion of the folded portion thereof which lies within the tubular member 12 will suffice to hold it in place. Furthermore, my invention may be applied to other forms of tubular racks than that shown, and it is not limited to placing the slot in a horizontal portion of the rack, as the slot may be located in any other convenient place.

While I have shown my improvement applied to a trailer, it may also be applied to other vehicles of this general type comprehended within the general term "trucks."

What I claim as my invention and desire to secure by Letters Patent, is—

A rack adapted to be mounted on a truck comprising a horizontally extending bar of circular cross section having a slot in one side thereof, and a reinforcing plate secured to said bar and having a slot overlying the slot in said bar, said two slots forming an elongated socket adapted to receive the folded edge of a ballot, the wall of said tubular bar opposite said slots constituting the bottom of said socket, and the side walls of said tubular bar permitting the sides of the ballot to expand laterally when the folded edge of the ballot is inserted in the socket.

WILLIAM H. ODIORNE.